(12) United States Patent
Keisar et al.

(10) Patent No.: US 12,271,152 B2
(45) Date of Patent: Apr. 8, 2025

(54) LIQUID ELECTROSTATIC INKS AND METHODS OF PRINTING

(71) Applicant: Hewlett-Packard Development Company, L.P., Spring, TX (US)

(72) Inventors: Hodaya Keisar, Nes Ziona (IL); Albert Teishev, Nes Ziona (IL); Liora Damari, Beer Tuvia (IL); Tehila Ben-Ezra, Nes Ziona (IL); Hanit Marom Tchaicheeyan, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 737 days.

(21) Appl. No.: 17/437,130

(22) PCT Filed: Jan. 20, 2020

(86) PCT No.: PCT/US2020/014279
§ 371 (c)(1),
(2) Date: Sep. 8, 2021

(87) PCT Pub. No.: WO2021/150203
PCT Pub. Date: Jul. 29, 2021

(65) Prior Publication Data
US 2022/0146957 A1    May 12, 2022

(51) Int. Cl.
*G03G 9/135*    (2006.01)
*C09D 11/037*    (2014.01)
(Continued)

(52) U.S. Cl.
CPC ......... *G03G 9/1355* (2013.01); *C09D 11/037* (2013.01); *C09D 11/10* (2013.01); *C09D 11/12* (2013.01)

(58) Field of Classification Search
CPC .... G03G 9/1355; C09D 11/037; C09D 11/10; C09D 11/12
See application file for complete search history.

(56) References Cited

U.S. PATENT DOCUMENTS

| 7,087,351 B2 | 8/2006 | Aylward et al. |
| 9,701,859 B2 | 7/2017 | Chen et al. |
| (Continued) | | |

FOREIGN PATENT DOCUMENTS

| JP | H05333600 | 12/1993 |
| JP | 2000-351929 A | 12/2000 |
| (Continued) | | |

OTHER PUBLICATIONS

Technical Data Sheet (TDS) for "FINAWAX E", Manufactured by Fine Organic Industries Ltd. (Year: 2021).*
(Continued)

*Primary Examiner* — Peter L Vajda
*Assistant Examiner* — Boone Alexander Evans
(74) *Attorney, Agent, or Firm* — HP Inc. Patent Department

(57) ABSTRACT

Here is described a liquid electrostatic ink composition comprising a pigment; a carrier liquid; a resin; a charge director; a fatty acid amide, and a polyalkylene wax. Methods of forming the liquid electrostatic ink compositions, and plastic substrates with the liquid electrostatic ink composition printed thereon, are also disclosed.

9 Claims, 5 Drawing Sheets

(51) Int. Cl.
*C09D 11/10* (2014.01)
*C09D 11/12* (2006.01)

(56) References Cited

U.S. PATENT DOCUMENTS

| | | |
|---|---|---|
| 2006/0204886 A1 | 9/2006 | Nakamura et al. |
| 2012/0079960 A1 | 4/2012 | Okuda et al. |
| 2012/0295196 A1 | 11/2012 | Urban et al. |
| 2014/0363208 A1* | 12/2014 | Roditi ............... G03G 9/12 430/114 |
| 2015/0338757 A1 | 11/2015 | Orlik et al. |
| 2017/0139339 A1 | 8/2017 | Rosenthal et al. |
| 2017/0216880 A1 | 8/2017 | Majszak et al. |
| 2018/0203372 A1 | 7/2018 | Takano |
| 2019/0055421 A1 | 2/2019 | Nesher et al. |

FOREIGN PATENT DOCUMENTS

| | | | |
|---|---|---|---|
| JP | 2005349679 | 12/2005 | |
| WO | 2012134457 | 10/2012 | |
| WO | 2013091667 | 6/2013 | |
| WO | 2014079482 | 5/2014 | |
| WO | 2015/165541 A1 | 11/2015 | |
| WO | 2018006984 | 1/2018 | |
| WO | WO-2018145774 A1 * | 8/2018 | ............. B32B 15/04 |
| WO | WO-2018224137 A1 * | 12/2018 | ............. C09D 11/02 |

OTHER PUBLICATIONS

Product Page for "FINAWAX E", Manufactured by Fine Organic Industries Ltd., Accessed Sep. 17, 2024, https://www.fineorganics.com/product/finawax-e/. (Year: 2024).*

* cited by examiner

LIQUID ELECTROSTATIC INKS AND METHODS OF PRINTING

BACKGROUND

Electrostatic printing processes can involve creating an image on a photoconductive surface, applying an ink having charged particles to the photoconductive surface, such that they selectively bind to the image, and then transferring the charged particles in the form of the image to a print substrate.

The photoconductive surface can be on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate.

Electrostatic printing processes may be used for printing on plastic substrates, such as shrink sleeve labels, which may be applied to containers after printing.

DETAILED DESCRIPTION

Figure 1:
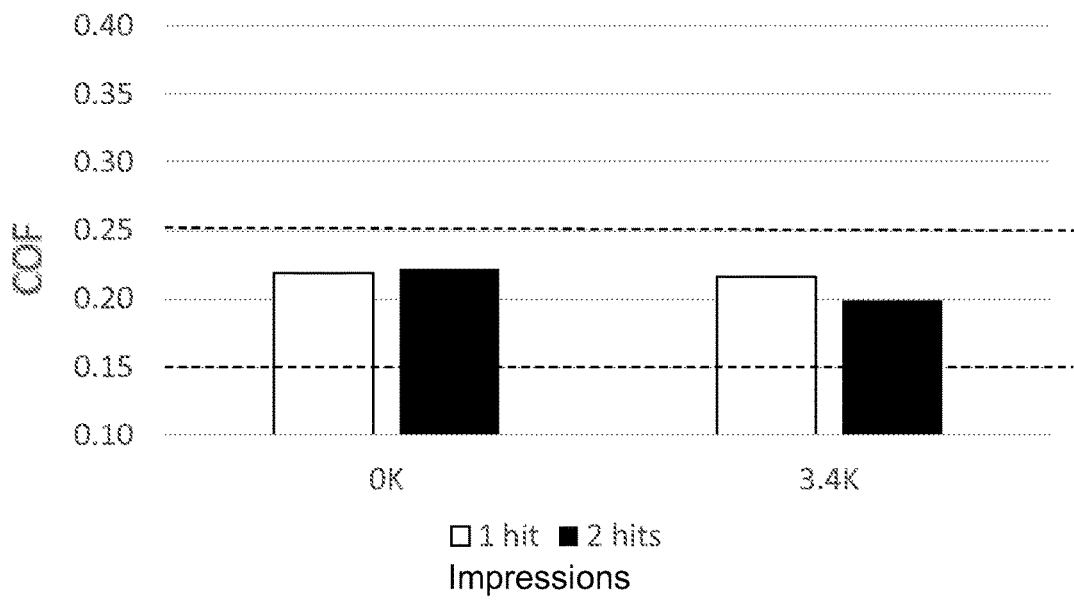
FIG. 1 is a graph showing coefficient of friction (COF) values for an example liquid electrostatic ink comprising polyethylene wax and the fatty acid amide erucamide. The COF values were measured after 24 h for prints at 0 k and 3.4 k impressions for both 1 and 2 hits. The ink was printed at 40% coverage. Dashed lines correspond to a COF range between 0.15 and 0.25.

Before the liquid electrostatic ink composition, a method of producing a liquid electrostatic ink composition and a plastic substrate with an electrostatic ink printed thereon is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier liquid," "carrier," or "carrier vehicle" refers to the fluid in which the polymers, particles, colorant, charge directors and other additives can be dispersed to form a electrostatic ink or electrophotographic ink. The carrier liquids may include a mixture of a variety of different agents, such as surfactants, co-solvents, viscosity modifiers, and/or other possible ingredients.

As used herein, "electrostatic ink composition" generally refers to an ink composition in liquid form that is suitable for use in an electrostatic printing process, sometimes termed an electrophotographic printing process. The electrostatic ink composition may comprise chargeable particles of a resin, which may be as described herein, dispersed in a carrier liquid, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not just pigment colorants, but other pigments such as organometallics, ferrites, ceramics, etc. The pigment can include white pigments, such as titanium dioxide.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as sometimes termed in the art. If a melt flow rate of a particular polymer is specified, unless otherwise stated, it is the melt flow rate for that polymer alone, in the absence of any of the other components of the electrostatic ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. The melt viscosity can may also be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate, e.g. a plastic substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 50-400 V/μm, or more, ins some examples 600-900 V/μm, or more.

As used herein, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" may refer to nitrogen, oxygen, halogens, phosphorus, or sulfur.

As used herein, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "about" is used to provide flexibility to a numerical range endpoint by providing that a given value may be a little above or a little below the endpoint. The degree of flexibility of this term can be dictated by the particular variable and would be within the knowledge of the skilled person to determine based on experience and the associated description herein.

As used herein, the term "fatty acid amide" refers to any amide formed from a fatty acid and an amine. The fatty acid amide may be formed from one fatty acid, or more than one fatty acid. As used herein, the term "fatty acid" refers to a carboxylic acid molecule with an aliphatic chain, which is either saturated or unsaturated, with an aliphatic chain length from 4 to 30.

As used herein, the term "calibration can" refers to the part of the printing apparatus which stores and distributes the ink used for calibration processes. The ink used for calibration processes can be referred to as the "calibration electrostatic ink" herein. The calibration can contain a known amount of ink, for example, 660 gr of ink. Before printing, a working dispersion of the ink is made by extracting all the ink from the calibration can and adding it to a known amount of imaging oil, for example about 2900 gr. As a result, a working dispersion with a fixed concentration is prepared and a calibration step takes place afterwards.

As used herein, the term "large ink can" refers to the part of the printing apparatus which stores and distributes the ink used for printing on the press. The ink used for printing on the press can be referred to as the "printing electrostatic ink" herein.

As used herein, the term "coefficient of friction" or "COF" may described by the formula $F_f=\mu F_n$, in which $F_f$ is the frictional force, μ is the coefficient of friction and $F_n$, is the normal force. The COF may be determined by a simple weight ratio method [Wf/ms] at various times after printing. The standard test method for testing COF is ASTM1894. The "frictional force" $F_f$ may be the force exerted by a surface when an object moves across it.

As used herein, impression refers to a side of a substrate that contains toner. Each colour layer considered as a single impression. As used herein, "Kimp" refers to impressions in units of a thousand.

As used herein, "hits" refers to the number of times that the printer prints over the same area of substrate.

As used herein, "drop point" refers to the temperature at which a substance passes from a semi-solid (e.g. a wax) to a liquid.

As used herein, a wt. % value of a component of the ink composition is to be taken as referring to a weight-for-weight (w/w) percentage of the component in the solids of the ink composition, and not including the weight of any carrier fluid present.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based only on their presentation in a common group without indications to the contrary.

As used herein, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not just the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In some examples, there is provided a liquid electrostatic ink composition comprising: a pigment; a carrier liquid; a resin; a charge director; a fatty acid amide; and a polyalkylene wax.

In some examples, there is provided a method of producing a liquid electrostatic ink composition comprising:
grinding a mixture comprising a pigment, a resin, and a polyalkylene wax in a carrier liquid, and mixing the carrier fluid with a fatty acid amide and a charge director. The method described herein may be used to form the liquid electrostatic ink compositions described herein.

In some examples, there is provided a plastic substrate with an electrostatic ink printed thereon, the electrostatic ink comprising a pigment, a resin, a charge director, a fatty acid amide and a polyalkylene wax.

In some examples, there is provided a method of printing on a plastic substrate, the method comprising:
providing an electrostatic ink composition comprising a pigment; a carrier liquid; a resin; a charge director; a fatty acid amide, and a polyalkylene wax;
forming a latent electrostatic image on a surface;
contacting the surface with the electrostatic ink composition, such that at least some of the pigment, resin, charge director, fatty acid amide and polyalkylene wax are transferred to the surface to form a developed toner image on the surface; and transferring the toner image to the plastic substrate.

Previous plastic substrates (e.g. shrink sleeves) printed with standard LEP inks were found to have a surface with a coefficient of friction (COF) that is too high for some automatic packaging operations. As a result, a number of LEP-printed shrink sleeves had to be coated with a varnish after printing, which increases the cost and time of production.

The present inventors have found that they can improve the friction properties of printed substrates having LEP inks printed thereon by including both a fatty acid amide, a polyalkylene wax to the ink composition. Surfaces printed with these inks were found to have a coefficient of friction that was within a suitable range (for example, a COF from 0.15 to 0.25). Furthermore, plastic substrates printed with electrostatic inks described herein may have a more COF stable print to print and a COF that is more stable over time. The electrostatic inks described herein can therefore be used to coat plastic substrates and shrink sleeves used in a wider range of processes, for example, automatic packaging. The inks described herein can therefore be used to coat plastic substrates (e.g. shrink sleeves) more consistently and reliably, such that any subsequent automatic packaging may run more efficiently or run unhindered. The inks described herein can also be used to form plastic substrates that do not slide during the sleeving procedure. The inks described herein may demonstrate good opacity after printing.

The process and LEP inks described herein may also be used directly on plastic substrates without initial priming. This may provide for a simpler, quicker and more cost-effective printing method for printing on plastic substrates, for example, shrink sleeves.

Liquid Electrostatic Ink Composition

Fatty Acid Amide

The electrostatic ink composition and/or the ink printed on the plastic substrate comprises a fatty acid amide. In some examples, the fatty acid amide is a fatty acid amide wax.

In some examples, the fatty acid amide has a molecular weight from 200 to 650, or from 225 to 600, or from 250 to 500, or from 275 to 475, or from 300 to 400, or from 325 to 350. In some examples, the fatty acid amide has a molecular weight less than 600, or less than 550, or less than 500, or less than 450, or less than 400, or less than 350. The molecular weight of the fatty acid amide may affect the migration properties of the fatty acid amide during printing.

In some examples, the electrostatic ink composition and/or the ink printed on the plastic substrate may comprise from 0.2 wt. % to 4 wt. % fatty acid amide, or from 0.3 wt. % to 3.75 wt. %, or from 0.5 wt. % to 3.5 wt. %, or from 0.75 wt. % to 3.25 wt. % fatty acid amide, wherein wt. % values refer to a weight-for-weight (w/w) percentage of solids in the ink composition and/or ink printed on the plastic substrate.

In some examples, the electrostatic ink composition and/or the ink printed on the plastic substrate may comprise less than 4 wt. % fatty acid amide, or less than 3.75 wt. %, or less than 3.5 wt. %, or less than 3.25 wt. %, or less than or equal to 3 wt. %, or less than or equal to 2.75 wt. %, or less than or equal to 2.5 wt. %, wherein wt. % values refer to a weight-for-weight (w/w) percentage of solids in the ink composition and/or ink printed on the plastic substrate.

In some examples, the electrostatic ink composition may comprise from 0.2 wt. % to 2 wt. % fatty acid amide, or from 0.5 wt. % to 1.5 wt. %, or from 0.75 wt. % to 1.25 wt. %, or from 0.8 wt. % to 1.0 wt. % fatty acid amide, wherein wt. % values refer to a weight-for-weight (w/w) percentage of solids in the ink composition and/or ink printed on the plastic substrate. In some examples, the electrostatic ink composition may comprise said amounts of fatty acid amide for use in a large ink can (e.g. a printing electrostatic ink).

In some examples, the electrostatic ink composition may comprise from 1 wt. % to 4 wt. % fatty acid amide, or from 2.25 wt. % to 3.5 wt. %, or from 2.25 wt. % to 3.25 wt. % fatty acid amide, wherein wt. % values refer to a weight-for-weight (w/w) percentage of solids in the ink composition and/or ink printed on the plastic substrate. In some examples, the electrostatic ink composition may comprise said amounts of fatty acid amide for use in a calibration can (e.g. a calibration electrostatic ink).

In some examples, the fatty acid amide has the following formula (I)

$$R^1C(O)NHR^2 \qquad (I)$$

wherein $R^1$ is an optionally substituted hydrocarbon group having at least 7 carbon atoms, or at least 10 carbon atoms, or at least 15 carbon atoms, or at least 18 carbon atoms or at least 20 carbons, or at least 22 carbons and $R^2$ is selected from hydrogen and an optionally substituted hydrocarbon group having at least 7 carbon atoms. The optionally substituted hydrocarbon group may be saturated or unsaturated, in some examples, unsaturated. In some examples, $R^1$ is an optionally substituted hydrocarbon group having from 7 to 30 carbon atoms, in some examples from 10 to 26 carbon atoms, in some examples from 10 to 22 carbon atoms and $R^2$ is selected from hydrogen and an optionally substituted hydrocarbon group having from 7 to 30 carbon atoms, in some examples from 10 to 26 carbon atoms, in some examples from 10 to 22 carbon atoms, in some examples from 15 to 22 carbon atoms. In some examples, $R^1$ is an unsaturated carbon group having at least 15 carbons, or least 18 carbons, or at least 18 carbons, or at least 20 carbons, and $R^2$ is hydrogen.

In some examples, the fatty acid amide is selected from palmitamide, stearamide, arachidamide, behenamide, oleamide, erucamide, linoleamide, stearyl stearamide, palmityl palmitamide and stearyl arachidamide. In some examples, the fatty acid amide is erucamide.

In some examples, the fatty acid amide has the following formula (II)

$$R^3C(O)NHCH_2CH_2NHC(O)R^4 \qquad (II)$$

wherein each of $R^3$ and $R^4$ is independently an optionally substituted hydrocarbon group having at least 7 carbon atoms. In some examples, each of $R^3$ and $R^4$ is independently an optionally substituted alkyl group having at least 7 carbon atoms, in some examples from 10 to 26 carbon atoms, in some examples from 10 to 22 carbon atoms. In some examples, the optionally substituted hydrocarbon group may be saturated or unsaturated. In some examples, the fatty acid amide is selected from stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide and palmitamidoethyloleamide.

In some of the examples described herein, the fatty acid amide is used as a migratory additive in the electrostatic ink. During printing, the fatty acid amid molecules are found to diffuse to the surface of the ink layer due to their good mobility, facilitated by the aliphatic chain of the molecule which has compatibility with the polymer matrix.

In some of the examples described herein, the amount of fatty acid is found to affect the coefficient of friction (COF) value of printed plastic substrates. In some examples, the amount of fatty acid in a calibration electrostatic ink (i.e. used in the calibration can) is found to affect the COF value at the beginning of the printing. In some examples, the amount of fatty acid in a printing ink (i.e. used in the large ink can) is found to affect the stabilization of the COF value during the printing run.

In some examples, the fatty acid amide may have a melting point from about 60° C. to about 100° C., or from about 70° C. to about 95° C., or from about 75° C. to about 90° C. In some examples, the fatty acid amide may have a melting point of at least 60° C., or at least 70° C., or at least 75° C. In some examples, the fatty acid amide may have a melting point of less than 110° C., or less than 100° C., or less than 90° C.

In some examples, the fatty acid amide may have been subject to grinding prior to being mixed with the ink (e.g. carrier fluid comprising pigment and resin). In some examples, the fatty acid amide is ground in the presence of carrier fluid (e.g. Isopar) and charge adjuvant (e.g. aluminum stearate).

In an example, the fatty acid amide used may have the tradename Finawax-E.

Polyalkylene Wax

The electrostatic ink composition and/or the ink printed on the plastic substrate comprises a polyalkylene wax.

In some examples, the polyalkylene wax is a polyethylene wax or a polypropylene wax. The polyalkylene wax may be an incompatible wax, that is, a wax that is incompatible with the resin.

In some examples, the wax may phase separate from the resin upon the cooling of the ink printed on a plastic substrate during and after the transfer of the ink film to the plastic substrate.

In some examples, the polyalkylene wax may have a drop point from 90° C. to 160° C., or from 100° C. to 150° C., or from 102° C. to 135° C., or from 105 to 128° C. In some examples, the polyalkylene wax has a drop point of at least 90° C., or at least 100° C., or at least 110° C. In some examples, the polyalkylene wax a drop point of less than 160° C., or less than 150° C., or less than 140° C., or less than 130° C. The drop point may be measured in accordance with ASTM D-3954.

In some examples, the polyalkylene wax may be insoluble in the carrier liquid at 25° C. In some examples, the polyalkylene wax may swell in the carrier liquid at 25° C. In some examples, the polyalkylene wax may have a solubility of less than 10 mg/ml in the carrier fluid, or less than 1 mg/ml in the carrier fluid, or less than 0.1 mg/ml in the carrier fluid, when measured at 25° C.

In some examples, the electrostatic ink composition and/or the ink printed on the plastic substrate comprises from 3 wt. % to 10 wt. % polyalkylene wax, or from 3.25 wt. % to 8 wt. %, or from 3.5 wt. % to 7 wt. %, or from 3.5 wt. % to 6.5 wt. %, or from 3.75 wt. % to 6.5 wt. %, or from 4 wt. % to 6 wt. %, or from 4.5 wt. % to 5 wt. % polyalkylene wax, wherein wt. % values refer to a weight-for-weight (w/w) percentage of solids in the ink composition and/or ink printed on the plastic substrate. In some examples, the electrostatic ink comprises at least 2 wt. % polyalkylene wax, or at least 3 wt. %, or at least 4 wt. %, or at least 4.5 wt. % or at least 5 wt. % polyalkylene wax, wherein wt. % values refer to a weight-for-weight (w/w) percentage of solids in the ink composition and/or ink printed on the plastic substrate. In some examples, the electrostatic ink comprises less than 10 wt. % polyalkylene wax, or less than 9 wt. %, or less than 8 wt. %, or less than 7 wt. %, or less than 6 wt. %, or less than 5.5 wt. % polyalkylene wax, wherein wt. % values refer to a weight-for-weight (w/w) percentage of solids in the ink composition and/or ink printed on the plastic substrate. In some examples, the electrostatic ink composition may comprise said amounts of polyalkylene wax for use in the calibration can (e.g. a calibration electrostatic ink), or the large ink can (e.g. a printing electrostatic ink). In some examples, the polyalkylene wax is a polyethylene wax or a polypropylene wax.

In some examples, the polyalkylene wax may have a D50 particle of 7 μm or less, or 6.5 μm or less, or 6 μm or less. The D50 may be measured in the carrier liquid using laser diffraction, for example in accordance with ISO13220. In some examples, the D50 may have been determined after grinding the polyalkylene wax in the liquid carrier.

In some examples, grinding the polyalkylene wax together with the ink (e.g. carrier fluid comprising pigment and resin) is found to improve printing quality by reducing background on the print. In other examples, the polyalkylene wax may have been subject to grinding prior to being added to the ink (e.g. carrier fluid comprising pigment and resin).

In these examples, the polyalkylene wax may have been ground in the presence of carrier fluid (e.g. Isopar) and charge adjuvant (e.g. aluminum stearate), prior to being added to the ink.

In some examples, the polyalkylene wax may have a density from 0.70 g/cm$^3$ to 1.20 g/cm$^3$, or from 0.80 g/cm$^3$ to 1.10 g/cm$^3$, or from 0.90 g/cm$^3$ to 1.00 g/cm$^3$, or from 0.94 g/cm$^3$ to 0.97 g/cm$^3$. In some examples, the polyalkylene wax has a density of less than 1.20 g/cm$^3$, or less than 1.10 g/cm$^3$, or less than 1.00 g/cm$^3$. In some examples, the polyalkylene wax has a density of greater than 0.70 g/cm$^3$, or greater than 0.75 g/cm$^3$, or greater than 0.80 g/cm$^3$, or greater than 0.85 g/cm$^3$, or greater than 0.90 g/cm$^3$. The density may be measured in accordance with ASTM D-1505.

In some examples, the polyalkylene wax may have a hardness of less than 2.0 dmm, or less than 1.5 dmm, or less than 1.25 dmm or less than 1.0 dmm. The hardness may be measured in accordance with ASTM D-5.

An example of polyethylene wax is ACumist® B-6 from Honeywell.

In the examples described herein, the polyalkylene wax may be used as a non-migratory additive. During printing, the polyalkylene wax was found not to migrate or diffuse through the ink layer.

In some examples, the addition of polyalkylene wax allows the achievement of similar and consistent COF values from hit to hit. This is improved over LEP inks in the absence of polyalkylene wax which showed larger variances in COF values from hit to hit.

Charge Director

The electrostatic ink composition and/or the ink printed on the plastic substrate comprises a charge director.

A charge director can be added to an electrostatic ink composition to impart a charge of a desired polarity, stabilise ink components and/or maintain sufficient electrostatic charge on the particles of an electrostatic ink composition.

In some examples, the charge director comprises an amine sulfonate salt In some examples, the amine sulfonic acid is an amine benzenesulfonate salt, for example, an alkylbenzene sulfonate salt, for example, a C8 to C15 alkylbenzene sulfonate salt, for example, a dodecyl (C12) alkylbenzene sulfonate salt. In some examples, the amine is a C2-C4 amine, for example, an isopropyl amine sulfonate salt.

In an example, the isopropyl amine sulfonic acid is dodecyl benzene sulfonic acid isopropyl amine (referred to as "GT"), which is available from Croda.

In some examples, the liquid electrostatic ink composition and/or the ink printed on the plastic substrate may comprise isopropyl amine sulfonate salt in an amount from 0.1 wt. % to 0.8 wt. %, or from 0.2 wt. % to 0.7 wt. %, or from 0.2 wt. % to 0.65 wt. %, or from 0.2 wt. % to 0.625 wt. %, or from 0.2 wt. % to 0.5 wt. %, wherein wt. % values refer to a weight-for-weight (w/w) percentage of solids in the ink composition and/or ink printed on the plastic substrate. In some examples, the liquid electrostatic ink composition may comprise an isopropyl amine sulfonate salt in an amount greater than 0.1 wt. %, or greater than 0.15 wt. %, or greater than 0.175 wt. %, or greater than 0.2 wt. %, or greater than 0.225 wt. %, or greater than 0.25 wt. %, or greater than 0.275 wt. %, or greater than 0.3 wt. % isopropyl amine sulfonate salt, wherein wt. % values refer to a weight-for-weight (w/w) percentage of solids in the ink composition and/or ink printed on the plastic substrate. In some examples, the liquid electrostatic ink composition and/or the ink printed on the plastic substrate may comprise an isopropyl amine sulfonate salt in an amount less than 1 wt. %, or less than 0.9 wt. %, or less than 0.8 wt. %, or less than 0.7 wt. %, or less than 0.6 wt. %, or less than 0.5 wt. %, or less than 0.4 wt. %, or less than 0.35 wt. %, or less than 0.325 wt. %, wherein wt. % values refer to a weight-for-weight (w/w) percentage of solids in the ink composition and/or ink printed on the plastic substrate. In some examples, the isopropyl amine sulfonate salt is found to stabilize the optical density of inks along the run, for example, white inks comprising a white pigment. In some examples, the isopropyl amine sulfonic acid may act as a stabilizing component. In some examples, the electrostatic ink composition may comprise said amounts of isopropyl amine sulfonate salt for use in the calibration can (e.g. a calibration electrostatic ink), or the large ink can (e.g. a printing electrostatic ink).

In some examples, the charge director may comprise at least two components. In some examples, the charge director may comprise metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director may comprise oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), and sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). The charge director may impart a negative charge or a positive charge on the resin-containing particles of an electrostatic ink composition.

In some examples, the charge director may further comprise a sulfosuccinate moiety of the general formula [R$_a$—O—C(O)CH$_2$CH(SO$_3$$^-$)OC(O)—O—R$_b$], where each of R$_a$ and R$_b$ is an alkyl group. In some examples, the charge director comprises nanoparticles of a simple salt and a sulfosuccinate salt of the general formula MA$_n$, wherein M is a metal, n is the valence of M, and A is an ion of the general formula [R$_a$—O—C(O)CH$_2$CH(SO$_3$$^-$)OC(O)—O—R$_b$], where each of R$_a$ and R$_b$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, NH$_4$, tert-butyl ammonium, Li$^+$, and Al$^{+3}$, or from any sub-group thereof. The simple salt may comprise an anion selected from SO$_4$$^{2-}$, PO$^{3-}$, NO$_3$$^-$, HPO$_4$$^{2-}$, CO$_3$$^{2-}$, acetate, trifluoroacetate (TFA), Cl$^-$, Bf, F$^-$, ClO$_4$$^-$, and TiO$_3$$^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further comprise basic barium petronate (BBP). Basic barium petronate is a barium sulfonate salt of a 21-26 hydrocarbon alkyl, and can be obtained, for example, from Chemtura. In the formula [R$_a$—O—C(O)CH$_2$CH(SO$_3^-$)OC(O)—O—R$_b$], in some examples, each of R$_a$ and R$_b$ is an aliphatic alkyl group. In some examples, each of R$_a$ and R$_b$ independently is a C$_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, R$_a$ and R$_b$ are the same. In some examples, at least one of R$_a$ and R$_b$ is C$_{13}$H$_{27}$. In some examples, M is Na, K, Cs, Ca, or Ba. The formula [R$_a$—O—C(O)CH$_2$CH(SO$_3^-$)OC(O)—O—R$_b$] and/or the formula MA$_n$ may be as defined in any part of WO2007130069.

In some examples, the charge director may comprise a combination of (i) soya lecithin (KT), (ii) a barium sulfonate salt, such as basic barium petronate (BPP) and iii) an isopropyl amine sulfonate salt, for example, dodecyl benzene sulfonic acid isopropyl amine (GT).

The electrostatic ink may comprise about 0.001 wt. % to 20 wt. % total charge director, in some examples. 0.01 wt. % to 20 wt. %, in some examples 0.01 wt. % to 10% wt. %, in some examples 0.01 wt. % to 1 wt. % total charge director by weight of the solids of the electrostatic ink composition and/or ink printed on the plastic substrate. The electrostatic ink may comprise about 0.001 wt. % to 0.15 wt. % total charge director by weight of the solids of the electrostatic ink composition and/or ink printed on the plastic substrate, in some examples 0.001 wt. % to 0.15 wt. %, in some examples 0.001 wt. % to 0.02% wt. % charge director by weight of the solids of the electrostatic ink composition and/or ink printed on the plastic substrate.

Charge Adjuvant

The electrostatic ink composition and/or the ink printed on the plastic substrate may further comprise a charge adjuvant. A charge adjuvant may be present with a charge director, and may be different to the charge director, and act to increase and/or stabilise the charge on particles, e.g. resin-containing particles, of an electrostatic ink composition. The charge adjuvant can include, but is not limited to, Barium Petronate™, Calcium Petronate™, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminum di and/or tristearate and/or aluminum di and/or tripalmitate. In some examples, the charge adjuvant may constitute about 0.001 to 0.4% by weight of the solids of the electrostatic ink composition and/or ink printed on the plastic substrate. In some examples, the charge adjuvant is aluminum stearate.

Ink Compositions

In some examples, the electrostatic ink composition and/or the ink printed on the plastic substrate may have a ratio of polyalkylene wax to fatty acid amide from 3:4 to 15:1 by weight, or from 1.25:1 to 10:1, or from 1.3:1 to 8:1, or from 1.5:1 to 6:1 by weight. In some examples, the ratio of polyalkylene wax to fatty acid amide is greater than 1:1 by weight, or 1.25:1, or 1.5:1, or 2:1, or 3:1, or 4:1 by weight. In some examples, the ratio of polyalkylene wax to isopropyl amine sulfonate salt is from 4:1 to 50:1.

In some examples, the electrostatic ink composition and/or the ink printed on the plastic substrate may have a ratio of polyalkylene wax to fatty acid amide from 8:1 to 3:1 by weight, or from 7:1 to 4:1, or from 6:1 to 5:1. Such ratios may be used in an electrostatic ink composition for use in the large ink can (e.g. a printing ink)

In some examples, the electrostatic ink composition and/or the ink printed on the plastic substrate may have a ratio of polyalkylene wax to fatty acid amide from 3:1 to about 1:1 by weight, or about 2:1 to about 1.25:1, or about 5:3. Such ratios may be used in an electrostatic ink composition for use in the calibration can (e.g. a calibration ink)

In some examples, the electrostatic ink may comprise:
0.2 wt. % to 4 wt. % fatty acid amide,
3 wt. % to 10 wt. % polyalkylene wax, and
0.2 wt. % to 0.7 wt. % isopropyl amine sulfonate salt, wherein wt. % values refer to a weight-for-weight (w/w) percentage of solids in the ink composition and/or ink printed on the plastic substrate. In some examples, the pigment is a white pigment. In some examples, the fatty acid amide is erucamide. In some examples, the pigment is a white pigment and the fatty acid amide is erucamide.

In some examples, the electrostatic ink may comprise:
0.2 wt. % to 4 wt. % fatty acid amide,
3.5 wt. % to 6.5 wt. % wt. % polyalkylene wax, and
0.1 wt. % to 0.8 wt. % isopropyl amine sulfonate salt, wherein wt. % values refer to a weight-for-weight (w/w) percentage of solids in the ink composition and/or ink printed on the plastic substrate. In some examples, the pigment is a white pigment. In some examples, the fatty acid amide is erucamide.

In some examples, the electrostatic ink may comprise:
3 wt. % to 10 wt. % polyalkylene wax,
0.2 wt. % to 0.7 wt. % isopropyl amine sulfonate salt, and
0.5 wt. % to 1.5 wt. % fatty acid amide or 2.25 wt. % to 3.5 wt. % fatty acid amide, wherein wt. % values refer to a weight-for-weight (w/w) percentage of solids in the ink composition and/or ink printed on the plastic substrate. In some examples, the pigment is a white pigment. In some examples, the fatty acid amide is erucamide. The amount of fatty acid amide may depend on whether the electrostatic ink is to be used in the calibration can or the large ink can.

In some examples, the electrostatic ink may comprise:
3.5 wt. % to 6.5 wt. % polyalkylene wax, and
0.2 wt. % to 0.45 wt. % isopropyl amine sulfonate salt, and
0.5 wt. % to 1.5 wt. % fatty acid amide or 2.25 wt. % to 3.5 wt. % fatty acid amide, wherein wt. % values refer to a weight-for-weight (w/w) percentage of solids in the ink composition and/or ink printed on the plastic substrate. The amount of fatty acid amide may depend on whether the electrostatic ink is to be used in the calibration can or the large ink can. In some examples, the pigment is a white pigment. In some examples, the fatty acid amide is erucamide.

In some examples, there is provided a first electrostatic ink and a second electrostatic ink. In some examples, the first electrostatic ink comprises:

3 wt. % to 10 wt. % polyalkylene wax; 0.2 wt. % to 0.7 wt. % isopropyl amine sulfonate acid, and 0.5 wt. % to 1.5 wt. % fatty acid amide. In some examples, the second electrostatic ink comprises 3.5 wt. % to 6.5 wt. % polyalkylene wax; 0.2 wt. % to 0.45 wt. % isopropyl amine sulfonate acid, and 2.5 wt. % to 3.5 wt. % fatty acid amide, wherein wt. % values refer to a weight-for-weight (w/w) percentage of solids in the ink composition and/or ink printed on the plastic substrate. In some examples, the pigment is a white pigment. In some examples, the fatty acid amide is erucamide. In some examples, the first electrostatic ink may be used in the large ink can, and the second electrostatic ink may be used in the calibration can.

Pigment

The electrostatic ink composition and/or the ink printed on the plastic substrate can comprise a pigment. In some examples, the pigment is a white pigment. In other words, the electrostatic ink composition is a white electrostatic ink composition. In some examples, the white pigment is selected from $TiO_2$, calcium carbonate, zinc oxide, and mixtures thereof. In some examples, the electrostatic ink composition comprises a white pigment selected from rutile, anatase, and brookite, and mixtures thereof. In some examples, the electrostatic ink composition comprises a white pigment form of rutile. The rutile form of $TiO_2$ may exhibit the highest refractive index among the other forms of $TiO_2$ and the other listed pigments.

The pigment, for example, the white pigment, may constitute at least 0.1 wt. % of the solids of the electrostatic ink composition and/or ink printed on the plastic substrate, in some examples at least 0.2 wt. % of the solids of the electrostatic ink composition, in some examples at least 0.3 wt. % of the solids of the electrostatic ink composition, in some examples at least 0.5 wt. % of the solids of the electrostatic ink composition, in some examples at least 1 wt. % of the solids of the electrostatic ink composition, in some examples, at least 5 wt. % of the solids, in some examples, at least 10 wt. % of the solids, in some examples, at least 15 wt. % of the solids, in some examples, at least 20 wt. % of the solids, in some examples, at least 30 wt. % of the solids, in some examples, at least 40 wt. % of the solids, in some examples, at least 50 wt. % of the solids, in some examples, at least 60 wt. % of the solids, in some examples, at least 70 wt. % of the solids. In some examples the pigment, e.g. the white pigment, may constitute from 1 wt. % to 95 wt. % of the solids of the electrostatic ink composition and/or ink printed on the plastic substrate, in some examples, from 25 wt. % to 90 wt. %, in some examples, from 50 wt. % to 85 wt. %, in some examples, from 55 wt. % to 82 wt. %, in some examples from 60 wt. % to 80 wt. % of the solids of the electrostatic ink composition, in some examples 65 wt. % to 80 wt. % of the solids of the electrostatic ink composition and/or ink printed on the plastic substrate.

Resin

The resin in the electrostatic ink composition and/or the ink printed on the plastic substrate can comprise a polymer including, but not limited to, a thermoplastic polymer. A thermoplastic polymer is sometimes referred to as a thermoplastic resin. In some examples, the polymer may be selected from ethylene or propylene acrylic acid co-polymers; ethylene or propylene methacrylic acid co-polymers; ethylene or propylene acrylic acid co-polymers; ethylene vinyl acetate co-polymers; co-polymers of ethylene or propylene (e.g. 80 wt. % to 99.9 wt. %), and alkyl (e.g. C1 to C5) ester of methacrylic or acrylic acid (e.g. 0.1 wt. % to 20 wt. %); co-polymers of ethylene (e.g. 80 wt. % to 99.9 wt. %), acrylic or methacrylic acid (e.g. 0.1 wt. % to 20.0 wt. %) and alkyl (e.g. C1 to C5) ester of methacrylic or acrylic acid (e.g. 0.1 wt. % to 20 wt. %); co-polymers of ethylene or propylene (e.g. 70 wt. % to 99.9 wt. %) and maleic anhydride (e.g. 0.1 wt. % to 30 wt. %); polystyrene; co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt. % to 20 wt. %)/ethylhexylacrylate (e.g. 10 wt. % to 50 wt. %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures in the art, for example as described in ASTM D1238.

The acidic side groups may be in free acid form or may be in the form of an anion and associated with a counterion or a plurality of counterions, for example, metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt. % to about 25 wt. % of the co-polymer, in some examples from 10 wt. % to about 20 wt. % of the co-polymer, in some examples from 10 wt. % to about 16 wt. % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, and in some examples, about 4:1 to about 3.5:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of from 15000 poise to 40000 poise, in some examples 20000 poise to 30000 poise, and a second polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 699™ (from DuPont), and an example of the second polymer is A-C® 5120 or A-C® 5180 (from Honeywell). The first and second polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding 45 the plate over plate rheometry isotherm at 120° C., 0.01 hz shear rate.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by Dow)), the AClyn® family of toners (e.g. AClyn® 201, AClyn® 246, AClyn® 285, and AClyn® 295), and the LOTADER® family of toners (e.g. LOTADER® 2210, LOTADER® 3430, and LOTADER® 8200 (sold by Arkema)).

The resin can constitute about 5 to 90%, in some examples about 5 to 50%, by weight of the solids of the electrostatic ink composition and/or the ink printed on the plastic substrate. The resin can constitute about 10 to 35%, in some examples about 15 to 30%, by weight of the solids of the electrostatic ink composition and/or the ink printed on the plastic substrate.

In an example, the resin comprises Nucrel 699™-copolymer of ethylene and methacrylic acid (11% methacrylic acid by weight) and Honeywell A-C® 5120-a copolymer of ethylene acrylic acid (15% acrylic acid by weight).

In some examples, the resin is insoluble in the carrier fluid at room temperature but soluble in the carrier fluid at elevated temperatures, for example at a temperature of at least 50° C., for example at a temperature of at least 60° C., for example at a temperature of at least 70° C., for example at a temperature of at least 80° C., for example at a temperature of at least 90° C., for example at a temperature of at least 100° C., for example at a temperature of at least 110° C., for example at a temperature of at least 120° C.

Carrier Liquid

In some examples, the electrostatic ink composition comprises a carrier liquid. In some examples, the particles comprising a resin and a slip agent, are suspended or dispersed in the carrier liquid. Generally, the carrier liquid can act as a dispersing medium for the other components in the electrostatic ink. For example, the carrier liquid can comprise or be a hydrocarbon, silicone oil, vegetable oil, etc. The carrier liquid can include, but is not limited to, an insulating, non-polar, non-aqueous liquid that is used as the medium for toner particles. The carrier liquid can include compounds that have a resistivity in excess of about 109 ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5TM, AF-6™ and AF-7TM (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid can constitute about 20% to 99.5% by weight of the electrostatic ink composition, in some examples 20% to 95% by weight of the electrostatic ink composition. The carrier liquid may constitute about 30 to 90% by weight of the electrostatic ink composition. In some examples, the carrier liquid may constitute about 30% to 75% by weight of the electrostatic ink composition. The carrier liquid may constitute about 30% to 70% by weight of the electrostatic ink composition, in some examples 40% to 65% by weight of the electrostatic ink composition.

The electrostatic ink, when printed on the plastic substrate, may be substantially free from carrier liquid. In an electrostatic printing process and/or afterwards, the carrier liquid may be removed, e.g. by an electrophoresis processes during printing and/or evaporation, such that substantially just solids are transferred to a substrate, e.g. the plastic substrate. Substantially free from carrier liquid may indicate that the ink printed on the plastic substrate contains less than 5 wt. % carrier liquid, in some examples, less than 2 wt. % carrier liquid, in some examples less than 1 wt. % carrier liquid, in some examples less than 0.5 wt. % carrier liquid. In some examples, the ink printed on the plastic substrate is free from carrier liquid.

Particles

In some examples, the electrostatic ink composition may comprise particles. The particles may be coated pigment particles comprising the pigment coated by the resin. In some examples, the coated particles may be formed by precipitation, as may be described herein. In some examples, the coated particles have a particle size from 1 to 20 µm in average (D50). Coated particles formed by precipitation, as described herein, may demonstrate improved opacity. The particle size may be measured in the carrier liquid using laser diffraction, for example in accordance with ISO13220

In some examples, the particles may be composite particles. The composite particles may comprise the resin, the pigment and the polyalkylene wax. The composite particles may comprise polyalkylene wax and coated particles comprising the pigment and the resin. In some examples, the composite particles may be formed by grinding. In some examples, the composite particles are formed by grinding a mixture of polyalkylene wax, resin and pigment in the carrier fluid. In some examples, the composite particles are formed by grinding the polyalkylene wax and coated pigment particles in the carrier fluid, the coated pigment particles comprising the pigment coated by the resin.

Method of Producing a Liquid Electrostatic Ink Composition

In some examples, there is provided a method of producing a liquid electrostatic ink composition comprising:
grinding a mixture comprising a pigment, a resin, and a polyalkylene wax in a carrier liquid, and
mixing the carrier liquid with a fatty acid amide and a charge director.

Precipitating

In some examples, the method of producing the electrostatic ink described herein further comprises, prior to grinding, precipitating the resin on the pigment to form coated pigment particles comprising the pigment and the resin. Precipitating the resin may comprise: heating the resin in the carrier fluid to dissolve the resin; suspending in the carrier fluid the pigment, and cooling the carrier fluid to precipitate the resin onto the pigment to form a coated pigment particle. The heating, suspending and cooling may be performed using any suitable method. In some examples, the heating comprises heating the carrier fluid to a temperature of at least 50° C., or at least 60° C., or at least 70° C., or at least 80° C., or at least 90° C., or at least 100° C., or at least 110° C., or least 120° C., for example, to dissolve the resin. In some examples, the cooling of the carrier fluid is may be controlled at a rate of less than 5° C. per hour, or less than 4° C. per hour, or less than 3° C. per hour.

Grinding

The grinding may be carried out using any suitable grinding apparatus. In some examples, the grinding may use a ball mill. The grinding may be carried out at any suitable temperature. In some examples, the grinding is performed for at least 2 hours, or at least 4 hours, or at least 8 hours, or at least 10 hours.

Before grinding, the pigment, resin and polyalkylene wax may be mixed to form the mixture. The pigment, resin and polyalkylene wax may be added to the mixture in any particular order. In some examples, the mixing of the resin and/or pigment with the carrier liquid is performed before mixing of the polyalkylene wax.

In some examples, grinding a mixture comprising a pigment, a resin, and a polyalkylene wax may lead to the formation of composite particles comprising the resin, the pigment and the polyalkylene wax.

Mixing

The fatty acid amide and charge director are mixed with the carrier liquid (i.e. the carrier liquid already comprising the pigment, resin and polyethylene wax). In some examples, a charge adjuvant is further mixed with the carrier liquid. The mixing may be performed at any suitable temperature, for example, room temperature. In an example, the mixing is performed at a temperate from 10° C. to 40° C. The mixing may be performed at any suitable mixing speed. The mixing may be performed for any suitable length of time. In an example, the mixing is performed for at least 30 minutes, or at least 1 hour, or at least 3 hours, or at least 6 hours.

The charge director and fatty acid amide may be mixed with the carrier liquid (i.e. the carrier liquid already comprising the pigment, resin and polyethylene wax) in any suitable order. For example, the mixing of the fatty acid amide with the carrier liquid may be performed before, after, or concurrently with the mixing of the charge director. In some examples, the mixing of the fatty acid amide with the carrier liquid is performed before mixing with the charge director. In some examples, the charge director may comprise at least two components (e.g. an isopropyl amine sulfonate salt and a second component). The at least two components may be added at the same or different points of the mixing process. In some examples, the carrier fluid (i.e. the carrier liquid already comprising the pigment, resin and polyethylene wax) is mixed with isopropyl amine sulfonate salt and a second component, e.g., NCD (e.g. comprising soya lecithin, basic barium petronate and further isopropyl amine sulfonate salt) concurrently.

Plastic Substrate with an Electrostatic Ink Printed Thereon

In some examples, there is provided a plastic substrate with an electrostatic ink printed thereon, the electrostatic ink comprising a pigment, a resin, a charge director, a fatty acid amide and a polyalkylene wax. The plastic substrate with an electrostatic ink printed thereon may have been produced by printing on a plastic substrate any electrostatic ink composition described herein. In some examples, the electrostatic ink comprises a white pigment.

The plastic substrate may be any substrate comprising plastic. The plastic substrate is, in some examples, a substrate comprising, consisting essentially of or consisting of plastic. A substrate consisting essentially of plastic may comprise at least 90 wt. % plastic, in some examples at least 95 wt. % plastic, in some examples at least 98 wt. % plastic, in some examples at least 99 wt. % plastic. In some examples, the plastic substrate is transparent prior to printing.

In some examples, the plastic substrate comprises a plastic, which may be a plastic for forming a shrink sleeve. Shrink sleeve, or shrink wrap material, is material that, in an expanded state, for example in a stretched state, will contract upon the application of heat. In use, before or after printing the ink on the shrink sleeve or shrink wrap, the shrink sleeve can be put over the container in an expanded state. Heat can then be applied, such that the material of the shrink sleeve or shrink wrap contracts, gripping the container it surrounds. In some examples, the plastic substrate may comprise a single layer of material, which may comprise or be plastic, or a plurality of layers of material, each of which may comprise or be plastic, and may be different to one another. In some examples, the plastic substrate may be in the form of a sleeve, in some examples a shrink sleeve, which may be in an expanded or contracted state, and may or may not wrap an object, such as a container.

In some examples the plastic substrate may comprise a polyalkylene, polyethylene terephthalate, polyethylene terephthalate glycol, polystyrene, polyvinyl chloride, polyethylene-2,6-napthalate, polyhexamethylene adipamide, polymers of alpha mono-olefinically unsaturated hydrocarbons having polymer producing unsaturation such as butene, vinyl acetate, methylacrylate, 2-ethyl hexyl acrylate, isoprene, butadiene acrylamide, ethylacrylate and N-methyl-n-vinyl acetamide. In some examples, the plastic substrate comprises a plastic, which may be a plastic for forming a shrink sleeve, selected from polyethylene, polypropylene, polyisopropylethylene and polyisobutylethylene. In some examples, the plastic substrate comprises a monoaxially or biaxially oriented sheet of plastic. In some examples, the substrate comprises a plastic selected from an oriented polypropylene and an oriented polyethylene. In some examples, the plastic of the plastic substrate is selected from monoaxially oriented polypropylene, biaxially oriented polypropylene, monoaxially oriented polyethylene and biaxially oriented polyethylene.

In some examples, the plastic substrate has a primer on a surface onto which the electrostatic ink is printed. In some examples, the primer may be selected from a polyacrylic acid polymer, for example, a polyacrylic acid copolymer. In some examples, the polyacrylic acid polymer may comprise an ethylene acrylic acid copolymer. The primer may include another polymeric component, for example, a polyethylene polymer, or any other suitable polymer. The primer also may include a non-polymeric component, for example, silica, wax, and/or talc. In some examples, the primer may comprise a blend of a polyacrylic acid polymer and, in some examples, a non-polymeric component, for example, silica, wax, and/or talc. In some examples, the primer may comprise a blend of a polyacrylic acid polymer, a polyethylene polymer, and, in some examples, a non-polymeric component, for example, silica, wax, and/or talc. In another example, the primer may comprise a blend of a polyacrylic acid polymer and a polyethylene polymer. In some examples, the primer may comprise polyethyleneimine.

Some examples of materials that may be suitable for use in the primer include DigiPrime® 050 primer (available from Michelman, Inc., Cincinnati, Ohio) and Michem® In-Line Primer 030.

In some examples, the plastic substrate is or comprises a sheet of plastic, which, in some examples, has primer on the surface thereof, onto which the electrostatic ink is printed thereon. The sheet of plastic may be a continuous sheet. The sheet of plastic may be a non-porous sheet of plastic. At least part of the sheet of plastic may be wound onto a roll.

In some examples, the plastic substrate, for example, in the form of a sheet, has a thickness of at least 5 µm, in some examples at least 10 µm, in some examples at least 30 µm, in some examples at least 40 µm. In some examples, the plastic substrate is in the form of a sheet having a thickness of from 5 µm to 1 mm, in some examples 5 µm to 200 µm, in some examples 5 µm to 100 µm, in some examples 10 µm to 80 µm, in some examples 10 µm to 60 µm, in some examples 20 µm to 60 µm, in some examples 30 µm to 50 µm, in some examples 35 µm to 45 µm.

In some examples, the plastic substrate with an electrostatic ink printed thereon may have a COF value within any suitable range, for example, from 0.125 to 0.275, or from 0.125 to 0.25, or from 0.15 to 0.275, or from 0.15 to 0.25.

In some examples, the electrostatic ink printed thereon has been printed at a coverage (e.g. white coverage) of from 30% to 200%, or from 30% to 90%. In some examples, the electrostatic ink printed at a coverage (e.g. white coverage) of less than 200%, or less than 150%, or less than 100%, or less than 80%, or less than 60%, or less than or equal to 40%.

EXAMPLES

The following illustrates examples of the materials, methods and related aspects described herein. Thus, these examples should not be considered as restricting the present disclosure, but are merely in place to teach how to make examples of compositions of the present disclosure. As such, a representative number of compositions and their method of manufacture are disclosed herein.

Materials

An electrostatic ink formulation was developed, comprising the following components:

Resin(s)

Nucrel 699™

A copolymer of ethylene and methacrylic acid, contains 11% by weight methacrylic Acid comonomer content. It is commercially available from Dow.

A-C® 5120

An Ethylene acrylic acid (EAA) copolymer with an acrylic acid (AA) content of 15% by weight. Commercially available in Honeywell Company.

Pigment

White Ti-Pure™ R-900 is a rutile titanium dioxide pigment manufactured by the chloride process for general interior coatings applications mean particle size-410 nm. Commercially available in DuPont Company.

Polyalkylene Wax

Polyethylene homopolymer wax, Tradename—ACumist B-6 wax from Honeywell.

Fatty Acid Amide

Fatty acid unsaturated erucamide amide wax (E), with formula $CH_3$ $(CH_2)_7CH=CH(CH_2)_{11}CONH_2$ and a molecular weight of 337.58—Finawax-E—Fine Organics Isopropyl Amine Sulfonate Salt Dodecyl benzene sulfonic acid isopropyl amine (GT), supplied by Croda™

NCD—Natural charge director 6.6 wt. % KT (natural soya lecithin in phospholipids and fatty acids), 9.8 wt. % BBP (Basic barium petronate, i.e, a barium sulfonate salt of a 21-26 carbon hydrocarbon alkyl, available from Cemtura™) and 3.6 wt. % GT (Dodecyl benzene sulfonic acid isopropyl amine), the balance being (80 wt. %) Isopar L™.

VCA

VCA indicates an aluminum stearate from Sigma Aldrich.

Ink Composition

A general procedure for WFS ink preparation is presented. Precipitation and grinding steps were the same for all the examples.

Example 1

Ink for Calibration Cans:
- 40 kg grinded ink at 42% NVS was mixed together with the following components:
- 1866.66 g of erucamide slurry (mixture of 68% Isopar-LT; 1.07% aluminum stearate [Sigma-Aldrich, Israel; and 30.9% Finawax E [Fine Organic, India]);
- 212.83 g of NCD at 20% NVS (inc. 7.66 g of Isopropyl amine sulfonate salt (Croda™)) 88.61 g of Isopropyl amine sulfonate salt (Croda™)

Ink for Large Ink Cans:
- 40 kg grinded ink at 42% NVS was mixed together with the following components:
- 622.22 g of erucamide slurry (mixture of 68% Isopar-LT; 1.07% aluminum stearate [Sigma-Aldrich, Israel; and 30.9% Finawax E [Fine Organic, India]);
- 206.51 g of NCD at 20% NVS (inc. 7.605 g of Isopropyl amine sulfonate salt (Croda™)) 59 g of Isopropyl amine sulfonate salt (Croda™)

Example 2

Ink for Calibration Cans:
- 40 kg grinded ink at 42% NVS was mixed together with the following components:
- 1555.55 g of erucamide slurry (mixture of 68% Isopar-L™; 1.07% aluminum stearate [Sigma-Aldrich, Israel; and 30.9% Finawax E [Fine Organic, India]);
- 211.25 g of NCD at 20% NVS (inc. 7.43 g of Isopropyl amine sulfonate salt (Croda™)) 87.95 g of Isopropyl amine sulfonate salt (Croda™)

Ink for Large Ink Cans:
- 40 kg grinded ink at 42% NVS was mixed together with the following components:
- 622.22 g of erucamide slurry (mixture of 68% Isopar-LT; 1.07% aluminum stearate [Sigma-Aldrich, Israel; and 30.9% Finawax E [Fine Organic, India]);
- 206.51 g of NCD at 20% NVS (inc. 7.605 g of Isopropyl amine sulfonate salt (Croda™)) 59 g of Isopropyl amine sulfonate salt (Croda™)

Example 3

Ink for Calibration Cans:
- 40 kg grinded ink at 42% NVS was mixed together with the following components:
- 1244.44 g of erucamide slurry (mixture of 68% Isopar-L™; 1.07% aluminum stearate [Sigma-Aldrich, Israel; and 30.9% Finawax E [Fine Organic, India]);
- 209.67 g of NCD at 20% NVS (inc. 7.54 g of Isopropyl amine sulfonate salt (Croda™)) 87.29 g of Isopropyl amine sulfonate salt (Croda™)

Ink for Large Ink Cans:
- 40 kg grinded ink at 42% NVS was mixed together with the following components:
- 622.22 g of erucamide slurry (mixture of 68% Isopar-L™; 1.07% aluminum stearate [Sigma-Aldrich, Israel; and 30.9% Finawax E [Fine Organic, India]);
- 206.51 g of NCD at 20% NVS (inc. 7.605 g of Isopropyl amine sulfonate salt (Croda™)) 59 g of Isopropyl amine sulfonate salt (Croda™)

Example 4

Ink for Calibration Cans:
- 40 kg grinded ink at 42% NVS was mixed together with the following components:
- 1866.66 g of erucamide slurry (mixture of 68% Isopar-L™; 1.07% aluminum stearate [Sigma-Aldrich, Israel; and 30.9% Finawax E [Fine Organic, India]);
- 212.83 g of NCD at 20% NVS (inc. 7.66 g of Isopropyl amine sulfonate salt (Croda™)) 34.74 g of Isopropyl amine sulfonate salt (Croda™)

Ink for Large Ink Cans:
- 40 kg grinded ink at 42% NVS was mixed together with the following components:
- 622.22 g of erucamide slurry (mixture of 68% Isopar-L™; 1.07% aluminum stearate [Sigma-Aldrich, Israel; and 30.9% Finawax E [Fine Organic, India]);
- 206.51 g of NCD at 20% NVS (inc. 7.605 g of Isopropyl amine sulfonate salt (Croda™)) 33.71 g of Isopropyl amine sulfonate salt (Croda™)

Example 5

Ink for Calibration Cans:
- 40 kg grinded ink at 42% NVS was mixed together with the following components:
- 1866.66 g of erucamide slurry (mixture of 68% Isopar-LT; 1.07% aluminum stearate [Sigma-Aldrich, Israel; and 30.9% Finawax E [Fine Organic, India]);
- 212.83 g of NCD at 20% NVS (inc. 7.66 g of Isopropyl amine sulfonate salt (Croda™)) 52.12 g of Isopropyl amine sulfonate salt (Croda™)

Ink for Large Ink Cans:
- 40 kg grinded ink at 42% NVS was mixed together with the following components:
- 622.22 g of erucamide slurry (mixture of 68% Isopar-L™; 1.07% aluminum stearate [Sigma-Aldrich, Israel; and 30.9% Finawax E [Fine Organic, India]);
- 206.51 g of NCD at 20% NVS (inc. 7.605 g of Isopropyl amine sulfonate salt (Croda™)) 50.57 g of Isopropyl amine sulfonate salt (Croda™)

Example 6

Ink for Calibration Cans:
- 40 kg grinded ink at 42% NVS was mixed together with the following components:
- 1866.66 g of erucamide slurry (mixture of 68% Isopar-LT; 1.07% aluminum stearate [Sigma-Aldrich, Israel; and 30.9% Finawax E [Fine Organic, India]);
- 212.83 g of NCD at 20% NVS (inc. 7.66 g of Isopropyl amine sulfonate salt (Croda™)) 60.81 g of Isopropyl amine sulfonate salt (Croda™)

Ink for Large Ink Cans:
- 40 kg grinded ink at 42% NVS was mixed together with the following components:
- 622.22 g of erucamide slurry (mixture of 68% Isopar-L™; 1.07% aluminum stearate [Sigma-Aldrich, Israel; and 30.9% Finawax E [Fine Organic, India]);
- 206.51 g of NCD at 20% NVS (inc. 7.605 g of Isopropyl amine sulfonate salt (Croda™)) 59 g of Isopropyl amine sulfonate salt (Croda™)

Method for Forming the Liquid Electrostatic Ink

Precipitation

The resins composed of two polymers: Nucrel 699™ and A-C® 5120.

Adding the resins at total of 84 Kg and 218 Kg of Isopar™ L in a Bachiller 500 L mixer. Heat the content to 135° C. until all resin dissolved at mixing rate of 60 rpm. The pigment (198 Kg) was added at 100° C. at a mixing rate of 100 rpm. Precipitation took place by gradually reducing the temp. from 80° C. to 70° C. for 285 to 300 min. Next, gradual cooling to 45° C. for 3.5 h took place. The precipitation led to the formation of coated particles comprising the pigment coated by the resin. Then, the mixture was diluted to final % NVS (non-volatile solids) of 42% (28% resins by weight of solids, and 72% $TiO_2$ pigment by weight of solids).

Grinding

The precipitated ink mixture (carrier fluid comprising coated particles comprising the resin and the pigment (347.5 kg)) were grinded together with 5% HPB (HPB indicates an homopolymer polyethylene wax, available under the trade name ACumist® B6 from Honeywell company) on solids (7.3 kg) at 35° C. for 12 hr in Buhler bead mill (K60) grinding machine. HPB was added as solid to the mixture at the beginning of the grinding process.

Mixing

Calibration can (CC)

The ink was added to a Hobart mixer together with erucamide wax for 2 hrs at 25° C. Erucamide wax additive was grinded together with isopar in separate process to create a slurry. The erucamide wax additive was added to the mixture in a slurry form.

To the mixture was added dodecyl benzene sulfonic acid isopropyl amine (GT) and natural charge director (NCD) at 25° C.

Large ink can (LIC)

The ink is added to Hobart mixer together erucamide wax on solids for 2 hrs. The erucamide wax (E) additive is grinded together with isopar in separate process to create a slurry. The additive is added to the ink in a slurry form.

To the mixture was dodecyl benzene sulfonic acid isopropyl amine (GT) and natural charge director (NCD) at 25° C.

Printing

The white electrostatic inks were printed on a substrate for shrink sleeve application coated with a primer on 6600 and up press.

Coefficient of Friction (COF) Testing

The coefficient of friction (COF) of the printed plastic substrates was measured by a simple weight ratio method [Wf/ms] at various times after printing. This method covers the measurement of static COF, which is related to the force to begin movement of the surfaces relative to each other, and kinetic COF, which is related to the force to sustain the movement. Film-to-film values are measured by attaching a film to a dynamic sled (199 gr) and attaching another film to a stationary plane. These two films are then pulled across each other at a specified rate (15 cm/min). The force measured (in grams) is then divided by the weight of the sled to yield a dimensionless number between 0.0 and 1.0. In the set-up used to test the coefficient of friction of these examples, the sled weight was 199 g and the speed 15 cm/min.

A white ink, Example 2, comprising Polyalkylene wax and Fatty acid amide wax was measured after 24 h for prints at 0 k and 3.4 k impressions for both 1 and 2 hits, with an ink coverage of 40%. For all prints, COF values were found to be within a suitable range, for example, 0.15 and 0.25— (see FIG. 1, the range of 0.15 and 0.25 demonstrated by the dashed line). The white ink may have properties such that it can be printed on plastic for the shrink sleeve market or for automatic packaging.

The electrostatic ink comprises both a fatty acid amide and a polyalkylene wax. The fatty acid amide is a migrative additive with low molecular weight. The fatty acid amide molecules diffuse to the surface of the ink layer due to their good mobility facilitated by built-in compatibility with the polymer matrix. The polyethylene wax is instead acts as a non-migrative additive.

Comparative Testing

Two other inks "Comparative ink 1" and "Comparative Ink 2" were tested. Comparative inks 1 and 2 were prepared in the same way as the Example 2 ink above, however, Comparative ink 1 did not comprise a polyethylene wax nor a fatty acid amide. Comparative ink 2 did not comprise a fatty acid amide.

Figure 2:
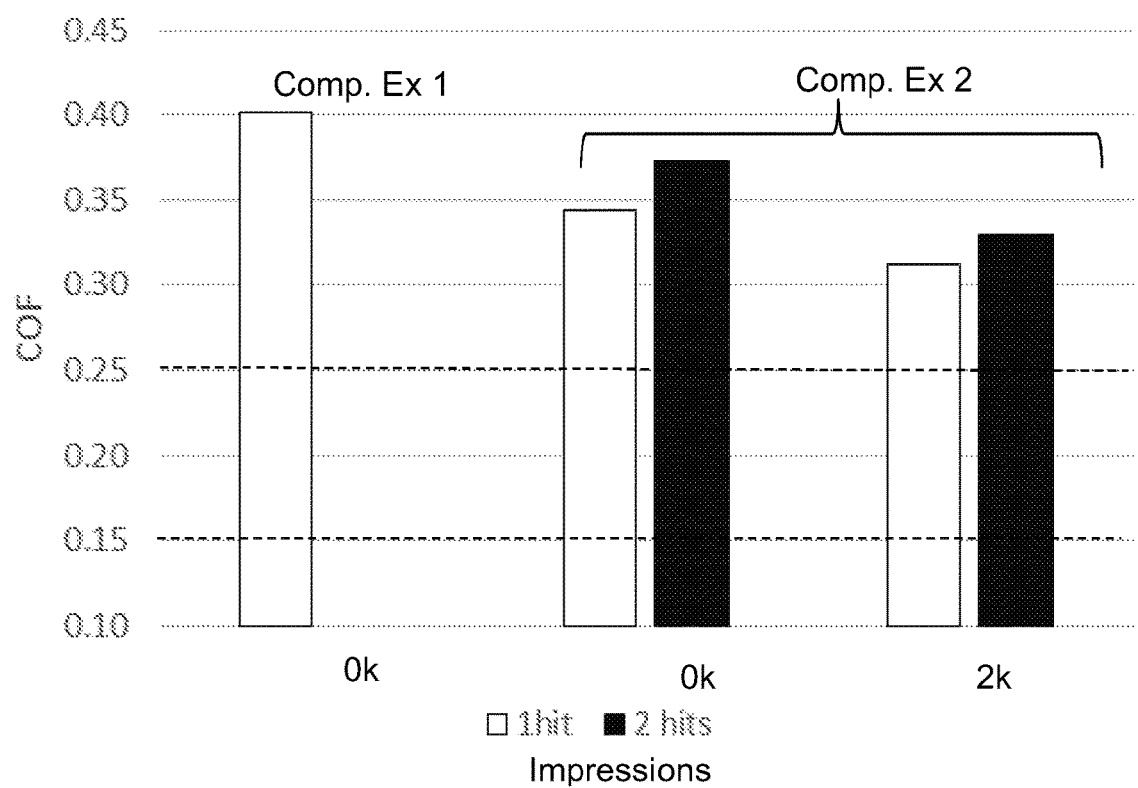
FIG. 2 is a graph showing coefficient of friction (COF) values for Comparative electrostatic inks. Comparative Example 1 comprises neither polyethylene wax nor the fatty acid amide erucamide; Comparative Example 2 comprises polyethylene wax, but not the fatty acid amide erucamide. The COF values were measured after 24 h for prints at 0 k and/or 2 k impressions for both 1 and 2 hits. The ink was printed at 40% coverage. Dashed lines correspond to a COF range between 0.15 and 0.25.

As can be seen by FIG. 2, both Comparative Ink 1 and Comparative ink 2 demonstrated COF values outside the COF range of 0.15 to 0.25, with an ink coverage of 40% (see FIG. 2) at 0 k and/or 2 k impressions. However, the COF value for Comparative Ink 2 was stable between hits. COF measurements took place after 24 h.

COF values for the Example ink above was compared against "Comparative ink 3"—an electrostatic white ink composed of ethylene copolymers prepared by mixing white ink (Resins: Nucrel 960™, Nucrel 699™, A-C® 5120. Pigments: SACHTLEBEN® R405, Kronos® 2076, LIONOL BLUE FG-7351, Sol-L Isopar, and NCD 4.0 TL 70) prepared by grinding process only, with fatty acid amide.

It was found that the Example ink 2 (i.e., as described above comprising both fatty acid amide additive and a polyethylene wax) was found to have improved COF values compared to Comparative Ink 3—see Table 1.

TABLE 1

| Feature | Range | Comparative electrostatic ink 3 (fatty acid amide) | Example Electrostatic ink (fatty acid amide + polyethylene wax) |
|---|---|---|---|
| Stable COF values | 0.15-0.25 | X | ✓ |
| COF values for 1, 2 hits | 0.15-0.25 | X | ✓ |
| COF reaches steady state within 24 hours | 0.15-0.25 | X | * |

* = very close to target.

As demonstrated by Table 1, Comparative ink 3 instead demonstrated a low coefficient of friction (COF) of <0.15 when printed. The COF value was also found to be unstable during the beginning of the printing process, and the COF value was found to be inconsistent between hits with the COF being lower for 2 hits vs. 1 hit.

The opacity of the liquid electrostatic ink (comprising fatty acid amide and polyethylene wax) was also compared to the "Comparative ink 3" after 1 and 2 hits. Opacity was measured using TEST/Plus® Opacity from Technidyne. Print was facing the beam light. White body test was performed for calibration of the print followed by black body test to estimate the print opacity (%). The example electrostatic ink was found to have a higher opacity than the comparative electrostatic ink 1 of 59% for 1 hit and 70% for 2 hits (comparison to 49% and 59%, respectively).

Optimization of Liquid Electrostatic Ink Formulation

The liquid electrostatic ink compositions were further optimized.

1. Amount of Fatty Acid Amide in the Calibration can (CC)

The dependency of COF values on the fatty acid amide content was studied. Different formulations with increased amount of fatty acid amide additive in the calibration cans (CC) were tested. The amount of the additive in the large ink can (LIC) was constant. Higher fatty acid amide amount in the CC lead to lower COF values. The calibration can contained ink with higher quantity of the fatty acid amide in comparison to the large ink can.

Figure 3:
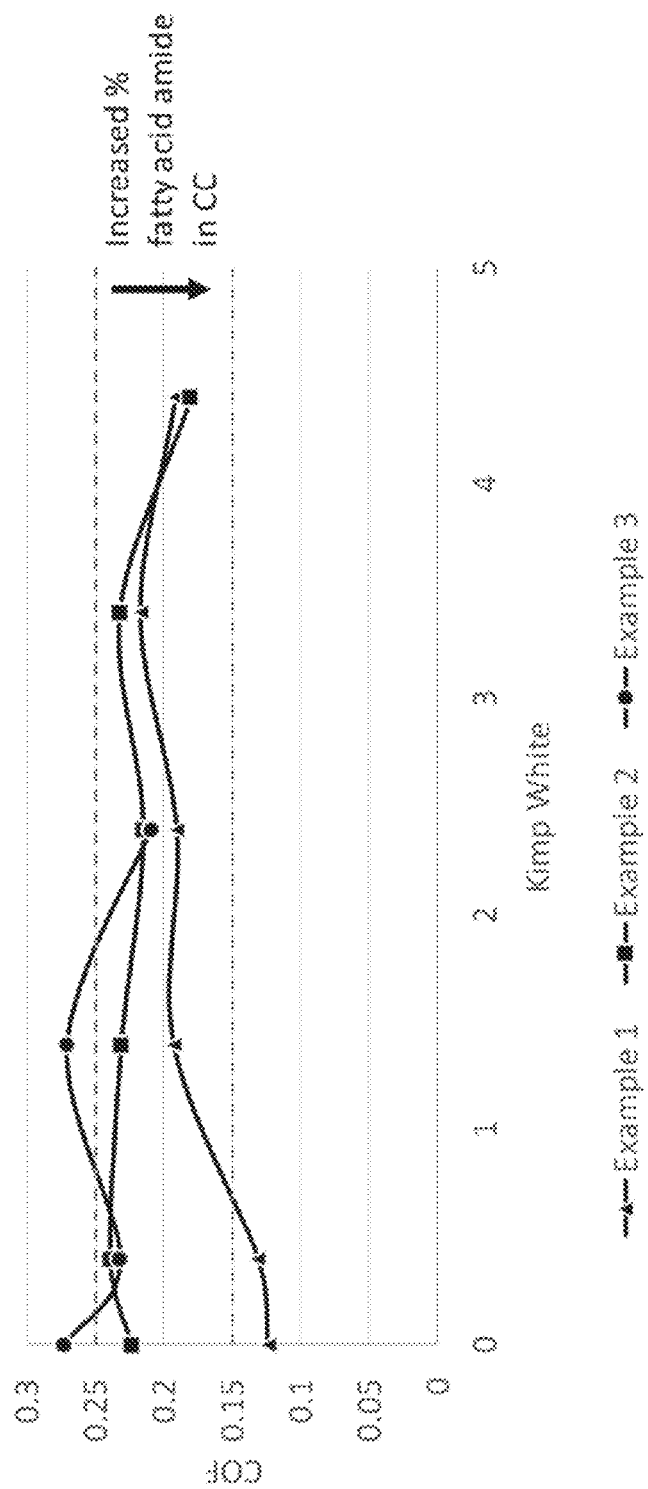
FIG. 3 is a graph showing coefficient of friction (COF) values as a function of Kimp for different weight percentages of fatty acid amide (erucamide wax) in electrostatic inks used in the calibration can (Kimp refers to 1000 impressions).

As can be seen from FIG. 3, the COF values of the ink layer appear to depend on the quantity of fatty acid amide additive in each formulation (FIG. 3). These results suggest that the amount of fatty acid amide in the calibration can may dictate the COF value in the beginning of the printing, whereas the role of the fatty acid amide in the large ink may help to stabilise the COF along the run, in other words, as the number of impressions is increased.

2. Amount of GT in the Calibration can and in the Large Ink can (LIC).

Figure 4:
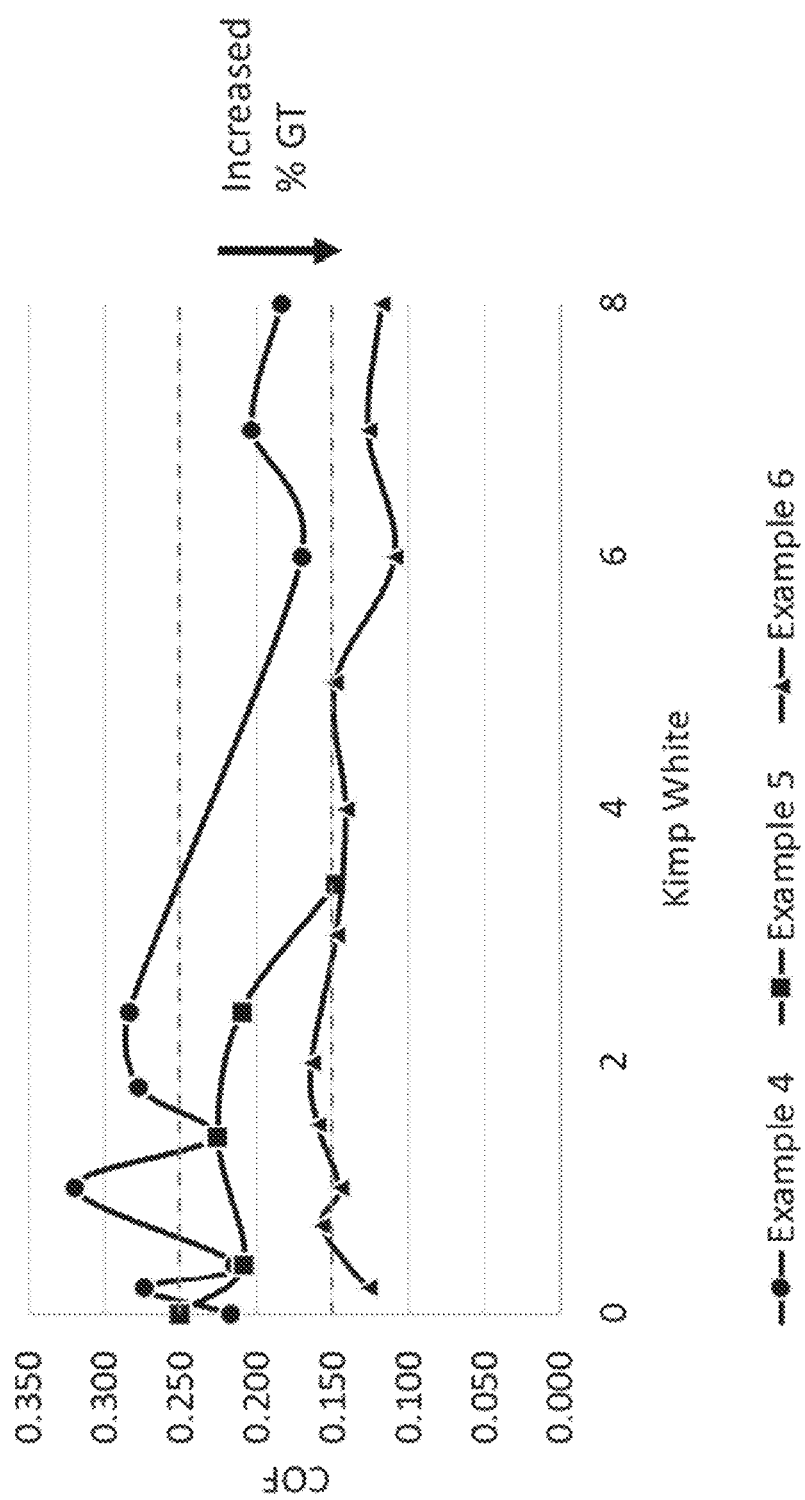
FIG. 4 is a graph showing coefficient of friction (COF) values as a function of Kimp for different amounts of isopropyl amine dodecyl benzene sulfonate salt ("GT") in electrostatic inks used in the calibration can (CC) and the large ink can (LIC).

Next, the amount of dodecyl benzene sulfonic acid isopropyl amine (GT) was varied to test its effect on COF values. The amount of GT was increased in both the large ink can and the calibration can. As can be seen from FIG. 4, COF values along the run were found to be also dependent on the GT amount both in the calibration can and in the large ink can. Higher amounts of GT led to lower COF values (FIG. 4).

3. % White Coverage Sequence During Run

Figure 5:
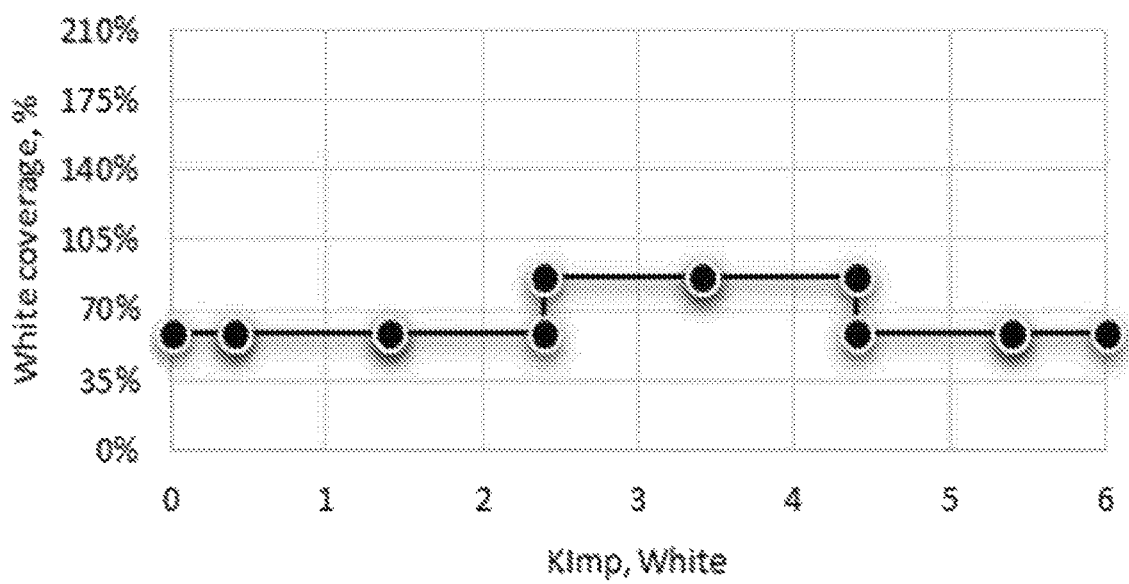
FIG. 5 shows a graph of % white coverage sequence along run. A corresponds to low (58-87%) coverage, and B corresponds to high (40-200%) coverage.
Figure 5:
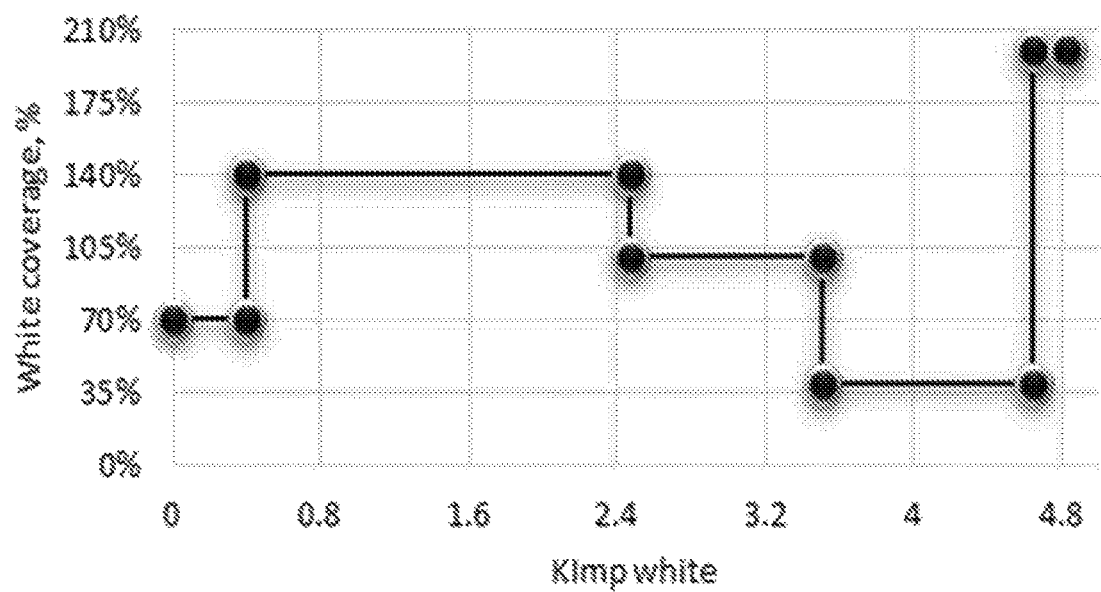
Figure 6:
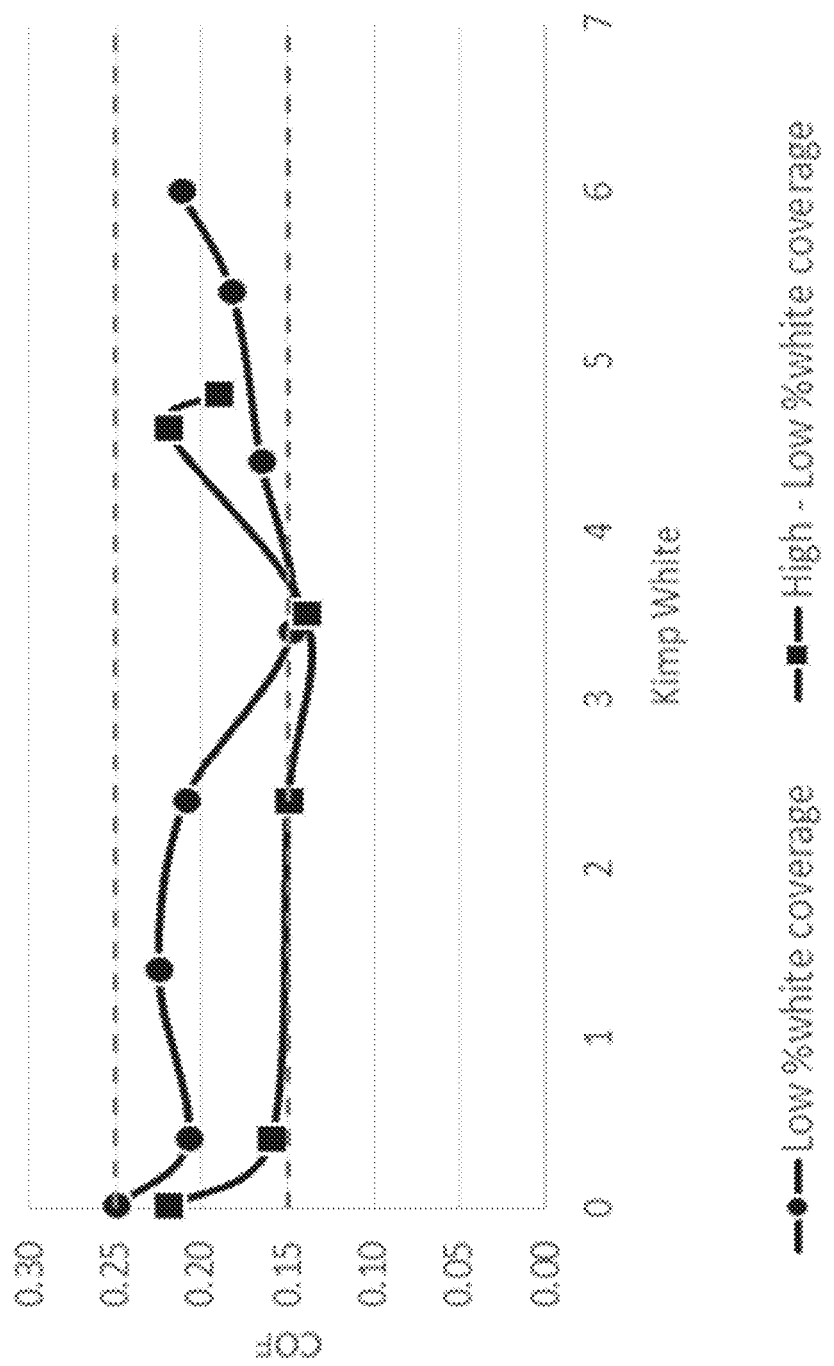
FIG. 6 shows a graph of COF values as a function of Kimp COF values for an Example formulation as a function of Kimp for Low (58-87%) coverage and High-Low (40-200%) coverage.

Further optimization of the formulation was done due to COF values dependency on % white coverage along run. Different white coverage (%) sequences were used during the development of the ink (FIG. 5). One sequence was composed of relatively low white coverages (58%-78%) whereas the other one was consisting of both high and low coverage (58%-200%). The COF values of the same formulation were found to be lower for higher white coverage (%) (FIG. 6). This behaviour might be attributed to the fact that in higher white coverage (%) the ink consumption is higher. As a result, the fatty acid amide wax (E) additive might not be accumulated in the ink tank but rather carried away and developed together with the ink, whereas for high-low coverage, the fatty acid amide (E) additive might have a tendency to be accumulated in the ink tank.

Summary

The electrostatic inks described herein comprise two different additives-a fatty acid amide additive (e.g. erucamide wax) and a polyalkylene wax additive (polyethylene wax).

This combination of these additives was found to generate similar COF values for 1 and 2 hits and stable COF values along run. The presence of polyalkylene wax in the ink contributed to similar COF values for 1 and 2 hits.

During the development of the ink, several factors were found to further affect the COF value of the ink:
1. Amount of fatty acid amide (E) in the large ink can (LIC) and the calibration can (CC)
2. Amount of dodecyl benzene sulfonic acid isopropyl amine (GT) in the large ink can (LIC) and the calibration can (CC)
3. % White coverage sequence during run While the materials, methods and related aspects have been described with reference to certain examples, it will be appreciated that various modifications, changes, omissions, and substitutions can be made without departing from the spirit of the disclosure. The features of any dependent claim may be combined with the features of any of the other dependent claims or any and/or any of the independent claims.

The invention claimed is:

1. A liquid electrostatic ink composition, comprising:
a pigment;
a carrier liquid;
a resin;
a charge director;
erucamide is present in the liquid electrostatic ink composition in an amount ranging from about 0.2 wt. % to about 4 wt. %, wherein wt. % values refer to a weight-for-weight (w/w) percentage of the erucamide in solids of the liquid electrostatic ink composition; and
a polyethylene wax is present in the electrostatic ink composition in an amount ranging from about 4 wt. % to about 6 wt. %, wherein the wt. % values refer to a w/w percentage of the polyethylene wax in the solids of the liquid electrostatic ink composition.

2. The liquid electrostatic ink composition according to claim 1, wherein the pigment is a white pigment.

3. The liquid electrostatic ink composition according to claim 1, wherein the charge director comprises an isopropyl amine sulfonate salt.

4. The liquid electrostatic ink composition according to claim 3, comprising from 0.2 wt. % to 0.7 wt. % of the isopropyl amine sulfonate salt, wherein wt. % values refer to a weight-for-weight (w/w) percentage of the isopropyl amine sulfonate salt in the solids of the liquid electrostatic ink composition.

5. A method of producing a liquid electrostatic ink composition, the method comprising:
grinding a mixture comprising a pigment, a resin, and a polyethylene wax in a carrier liquid; and
mixing the carrier liquid with erucamide and a charge director to form the liquid electrostatic ink composition,
wherein, after the mixing of the carrier liquid with the erucamide and the charge director, the erucamide is present in the liquid electrostatic ink composition in an amount ranging from about 0.2 wt. % to about 4 wt. % and the polyethylene wax is present in the liquid electrostatic ink composition in an amount ranging from about 4 wt. % to about 6 wt. %, and wherein wt. % values refer to a weight-for-weight (w/w) percentage of the erucamide and the polyethylene wax in solids of the liquid electrostatic ink composition.

6. The method of producing a liquid electrostatic ink composition according claim 5, further comprising precipitating the resin on the pigment to form coated pigment particles prior to grinding.

7. A plastic substrate with an electrostatic ink printed thereon, the electrostatic ink comprising a pigment, a resin, a charge director, erucamide, and a polyethylene wax, wherein the erucamide is present in the electrostatic ink in an amount ranging from about 0.2 wt. % to about 4 wt. % and the polyethylene wax is present in the liquid electrostatic ink composition in an amount ranging from about 4 wt. % to about 6 wt. %, and wherein wt. % values refer to a weight-for-weight (w/w) percentage of the erucamide and the polyethylene wax in solids of the electrostatic ink.

8. The plastic substrate according to claim 7, wherein the plastic substrate is a shrink film.

9. The plastic substrate according to claim 7, wherein the plastic substrate comprises an orientated polyethylene or an orientated polypropylene.

* * * * *